United States Patent [19]
Kramer

[11] Patent Number: 4,461,314
[45] Date of Patent: Jul. 24, 1984

[54] ELECTROHYDRAULIC VALVE

[75] Inventor: Kenneth D. Kramer, Waterloo, Iowa

[73] Assignee: Deere & Company, Moline, Ill.

[21] Appl. No.: 416,836

[22] Filed: Sep. 13, 1982

[51] Int. Cl.$^3$ .......................... G05D 7/06; F15B 13/044

[52] U.S. Cl. .......................... 137/106; 91/420; 91/446; 91/448

[58] Field of Search .......................... 91/420, 446, 448; 137/106; 60/460

[56] References Cited

U.S. PATENT DOCUMENTS 3,274,902 9/1966 Kleckner .
3,543,647 12/1970 Hall et al. .
3,587,399 6/1971 Dike et al. .
3,587,630 6/1971 Dike et al. .
3,792,710 2/1974 McDermott .......................... 91/420
4,343,153 8/1982 Kern et al. .......................... 60/460

*Primary Examiner*—Robert E. Garrett
*Assistant Examiner*—Timothy E. Nauman

[57] ABSTRACT

A 4-way, 3-position, on-off type electrohydraulic valve includes a pair of solenoid-operated inlet valves for controlling communication between a pump and a valve bore. A pair of adjustable check valves are positioned in opposite ends of the valve bore. A double-acting pilot return valve assembly is operably mounted in a central portion of the valve bore and is movable to engage and open one of the check valves to return fluid flow when pump pressure flows through the other check valve to a fluid motor.

4 Claims, 4 Drawing Figures

ELECTROHYDRAULIC VALVE

BACKGROUND OF THE INVENTION

The present invention relates to a flow control valve for controlling fluid flow to and from a fluid motor.

Conventional pressure-compensated flow conrol valves, such as described in U.S. Pat. No. 3,587,630, have spool-type directional control valves which provide metering of return fluid flow downstream from the load check valves. In some instances, such as under the influence of an overrunning load, this metering downstream from the load check valve reduces the pressure drop across the return fluid load check valve so that the pressure immediately downstream of the return load check valve is high enough to cause the pilot-operated return valve elements to permit closing of the return load check valve. Such a valve will then enter an undesirable cycling or chattering mode of operation. Furthermore, such valves do not provide a convenient means for independently varying the return flow metering in both directions. Furthermore, when the number of these functions reaches a certain number, it becomes practical to control the functions by means of electrohydraulic valves.

SUMMARY OF THE INVENTION

An object of the present invention is to provide a valve to control overrunning loads which does not "cycle" under an overrunning load.

Another object of the present invention is to provide a flow control valve which is electrically operated and which has independently controllable flow rates in both directions.

Another object of the present invention is to provide such a valve which can positively control and lock a hydraulic load.

A further object of the present invention is to provide such a valve that is simple, flexible and inexpensive, and which consumes little or no power when not in operation.

These and other objects are achieved by the present invention which includes a housing having a valve bore, a pair of inlet passages intersecting the valve bore intermediate the inlet passages and a pair of outlets at opposite ends of the valve bore. Two 2-way solenoid-operated inlet valves are positioned in the inlet passage. Two adjustable load check valves and a pilot-operated return/load check valve assembly are positioned in the valve bore. The solenoid valves are alternately energizable to obtain 3-position valve action. Flow regulation is provided by adjustment of a plug portion of the load check valves.

DETAILED DESCRIPTION

Figure 1:
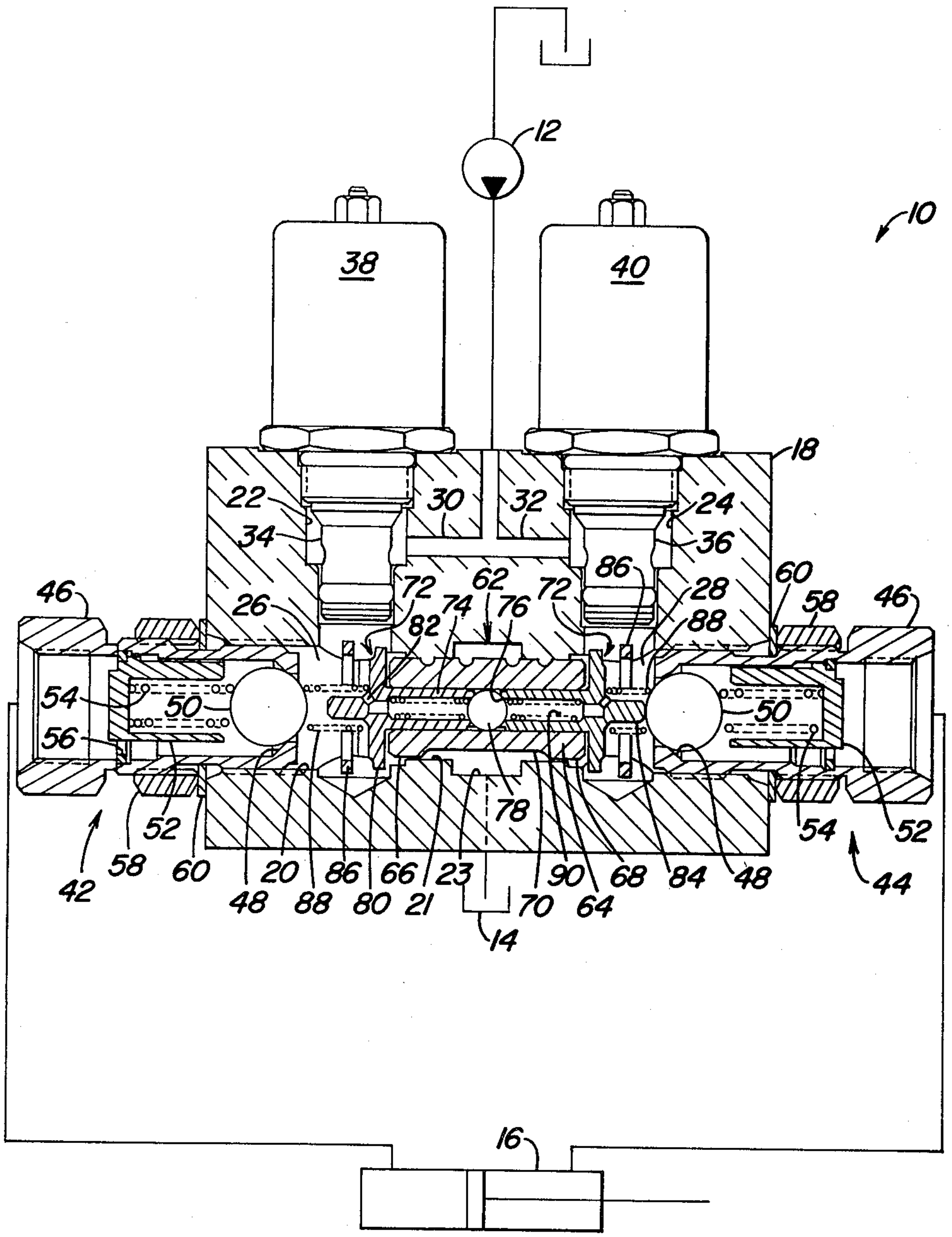
FIG. 1 is a simplified schematic of a hydraulic circuit including a cross-sectional view of the present invention.

The present invention is an electrohydraulic valve 10 for controlling fluid communication between a pump 12, a sump 14 and a fluid motor 16. The valve 10 has a housing 18 through which a valve bore 20 extends. The valve bore 20 has a central portion 21 with an annular groove 23 therein. The groove 23 comprises a portion of a return passage which is communicated with the sump 14. A pair of inlet bores 22 and 24 intersect the valve bore 20 at inlet chambers 26 and 28 and communicate these inlet chambers with the pump 12 via respective inlets 30 and 32. On-off fluid communication control is provided by inlet valve members 34 and 36 which are positioned by conventional on-off solenoids 38 and 40.

Check valves 42 and 44 are mounted at opposite ends of the valve bore 20. The check valves include hollow cylindrical plugs 46 which have annular inwardly facing check valve seats 48 for sealing engagement with check balls 50. The check valves also include spring guides 52 and springs 54 for urging the balls 50 towards engagement with the valve seats 48. The guides 52 are held in place by snap rings 56. The threaded connection between the plugs 46 and the housing 18 permits the plugs 46 to be inserted at varying depths into the valve bore 20, thereby permitting variable controlled metering of return fluid flow. Lock nuts 58 and washers 60 permit the plugs 46 to be locked at desired positions.

Figure 2:
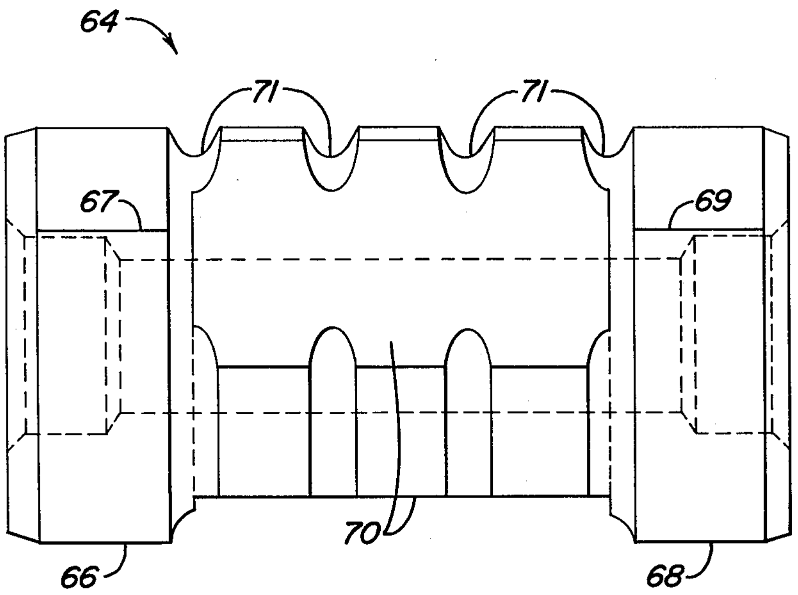
FIG. 2 is a side view of the pilot valve sleeve of the present invention.
Figure 3:
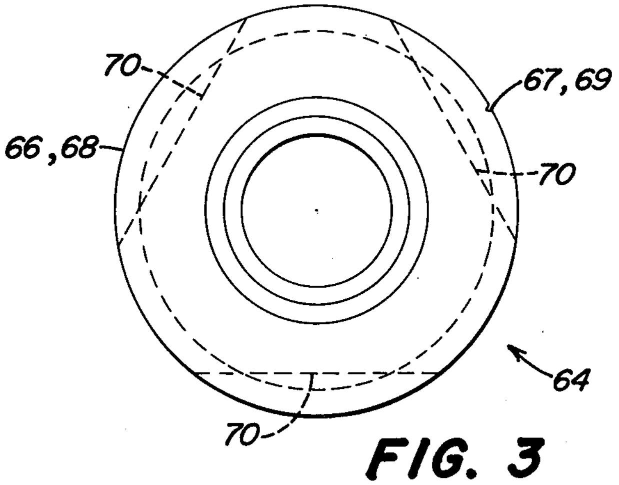
FIG. 3 is an end view of the pilot valve sleeve of the present invention.
Figure 4:
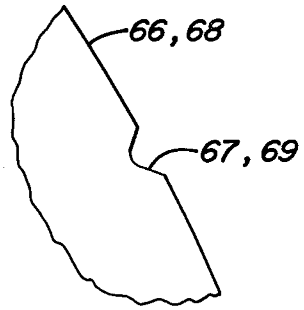
FIG. 4 is an enlarged view of a portion of FIG. 3.

A pilot valve assembly 62 is positioned in the central bore portion 21. The pilot valve assembly 62 includes a hollow cylindrical sleeve 64 slidably and substantially sealingly mounted in the bore portion 21. The sleeve 64 has a pair of lands 66 and 68 separated by a central portion which includes three flats 70, as best seen in FIGS. 2 and 3. The flats 70 provide a return fluid flow path between the inlet chambers 26, 28 and the groove 23 when the sleeve is sufficiently displaced from the centered position, shown in FIG. 1. The lands 66 and 68 include small pressure bleed grooves 67 and 69 (best seen in FIG. 4) which extend axially across the surface of the respective land to provide a pressure bleed path which aids recentering of the sleeve 64 when both check valves 42 and 44 reclose. Sleeve 64 also includes four annular balancing grooves 71 located between the lands 66 and 68.

The pilot valve assembly 62 also includes a pair of identical valve members 72, with hollow cylindrical stems 74, which are slidably received by the sleeve 64 at opposite ends thereof. The inner ends of the stems 74 form ball seats 76 for sealing engagement with a valve ball 78 which is positioned within the sleeve 64 between the stems 74. The valve members 72 also include flanged heads 80 which are engageable with opposite end faces of the sleeve 64. The heads 80 include passages 82 extending therethrough to communicate the interior of the hollow stems 74 with the inlet chambers 26 and 28. The heads 80 also include axially projecting stubs 84, the ends of which are engageable with the check balls 50. Snap rings 86, located in grooves on the wall of valve bore 20, are engageable with the valve members 72 to limit their movement away from the central bore portion 21. Springs 88, between each check ball 50 and its corresponding valve member 72, urge the balls 50 and the valve members 72 away from each other. Springs 90, received by each of the hollow stems 74, urge the valve ball 78 towards a central position between the stems 74.

Mode of Operation

If it is desired to extend fluid motor 16, solenoid 38 is energized to pull inlet valve member 34 upwards, viewing the figure, and to open inlet bore 22 and inlet chamber 26 to pump pressure via inlet 30. This pressurized fluid flows from inlet chamber 26 through check valve 42 and to the head end of fluid motor 16. The fluid pressure in inlet chamber 26 also acts upon sleeve 64 and via passage 82 of the left-hand valve member 72, acts upon the right-hand valve member 72 through ball 78, thus moving sleeve 64, ball 78 and the right-hand valve member 72 to the right, viewing the figure, until the head of the right-hand valve member 72 engages snap-ring 86. The stub 84 of the right-hand valve member 78 engages the right-hand check ball 50 and moves it away from its seat 48. This movement of sleeve 64 moves land 68 to the right and opens communication between inlet chamber 28 and sump 14 via flats 70 and groove 23. Thus, return fluid can now flow from the rod end of motor 16 to the sump via the open right-hand check valve 44, inlet chamber 28, flats 70 and groove 23.

This return fluid flow is metered by the variable and controlled clearance between check ball 50 and the seat 48. This controlled metering produces a pressure drop in the return fluid flow across check ball 50 which lowers the pressure in chamber 28 to a pressure which is lower than which would otherwise occur if the clearance between check ball 50 and seat 49 were not so limited. This reduced pressure in chamber 28 prevents the return fluid flow from moving pilot valve assembly 62 to the left and closing load check valve 44 under the influence of an overrunning load.

When it is desired to end the extension of motor 16, the inlet valve member 34 is closed by turning solenoid 38 off, thus terminating the fluid flow from pump 12 to motor 16. In the absence of fluid flow, check valve 44 closes to prevent back flow and the pressures in inlet chambers 26 and 28 begin to equalize. This pressure equalization permits sleeve 64, ball 78 and the right-hand valve member 72 to move back to their undisplaced positions, shown in the figure, under the influence of springs 54 and 88, thus allowing the ball 50 of check valve 44 to return to its seat. The small fluid leakage from the inlet chambers 26 and 28 to sump through bleed grooves 67 and 69 permits the elements of the pilot valve assembly 62 to completely return to their centered positions wherein both check valves 42 and 44 are closed, and further movement of fluid motor 16 is prevented.

The valve 10 operates in a similar manner to retract motor 16 if solenoid 40 is energized. However, by adjusting the depths of insertion of the plug 46 of check valves 42 and 44, the degree of restriction to return fluid flow provided by check valves 42 and 44 can be varied independent of each other. Thus, as shown in FIG. 1, the plug 46 of check valve 44 may be inserted further into the valve bore 20 than the plug 46 of check valve 42. Therefore, the left-hand valve member 72 cannot move the ball 50 of check valve 42 as far off its seat as can the right-hand member 72 move the ball 50 of check valve 44. Because of this, check valve 42 will present a greater resistance to return fluid flow when the fluid motor 16 is retracted than will be presented by check valve 44 when fluid motor 16 is exhausted.

While the invention has been described in conjunction with a specific embodiment, it is to be understood that many alternatives, modifications, and variations will be apparent to those skilled in the art in light of the aforegoing description. Accordingly, this invention is intended to embrace all such alternatives, modifications, and variations which fall within the spirit and scope of the appended claims.

I claim:

1. A valve assembly for controlling fluid communication between a pump, a reservoir and a double-acting fluid motor, the valve assembly comprising:

a housing having a valve bore therein, a pair of pump inlets each communicating with a portion of the valve bore, a pair of fluid motor outlets communicating with the valve bore, and a reservoir port communicating with the valve bore;

a pair of inlet valves for controlling fluid communication to the valve bore via corresponding ones of the pump inlets;

a pair of load check valves in the valve bore for permitting one-way fluid flow from each inlet through a portion of the valve bore to a corresponding one of the fluid motor outlets, each load check valve being individually adjustable to vary its restriction to return fluid flow, each load check valve comprising a hollow cylindrical plug threadably mounted in the housing at an end of the valve bore, the plug having an annular valve seat on an inner end thereof, a check ball received by the plug and sealingly engageable with the valve seat, a hollow guide member mounted in the plug, and a resilient member received by the guide member and engaging the check ball, the resilient member being biased to urge the check ball towards the valve seat;

resilient means for biasing the load check valves to a closed position; and pilot-operated return valve positioned in the valve bore between the load check valves, the return valve including means for controlling return fluid flow from one of the load check valves to the reservoir port, the return valve having a pair of pressure-responsive valve members, each movable to engage and open one of the load check valves to return fluid flow from one fluid motor outlet when supply fluid is flowing through the other load check valve to the other fluid motor outlet.

2. A valve assembly for controlling fluid communication between a pump, a reservoir and a double-acting fluid motor, the valve assembly comprising:

a housing having a valve bore therein, a pair of pump inlets each communicating with a portion of the valve bore, a pair of fluid motor outlets communicating with the valve bore, and a reservoir port communicating with the valve bore;

a pair of inlet valves for controlling fluid communication to the valve bore via corresponding ones of the pump inlets;

a pair of load check valves in the valve bore for permitting one-way fluid flow from each inlet through a portion of the valve bore to a corresponding one of the fluid motor outlets;

resilient means for biasing the load check valves to a closed position; and a pilot-operated return positioned in the valve bore between the load check valves, the return valve including means for controlling return fluid flow from one of the load check valves to the reservoir port, the return valve having a pair of pressure-responsive valve members, each movable to engage and open one of the load check valves to return fluid flow from one fluid motor outlet when supply fluid is flowing through the other load check valve to the other fluid motor outlet, the return valve comprising a hollow cylindrical sleeve movable in the valve bore with respect to the housing and the load check valve to open and close a return flow path defined by the sleeve and the wall of the valve bore, and first and second valve members movable with respect to the sleeve, each valve member having a stem slidably received by the sleeve and a stub engageable with a corresponding load check valve, the sleeve and one of the valve members moving in response to said flow to one of the fluid motor outlets via one of the load check valves to engage and open the other load check valve and to open the return flow path to fluid flow from the other fluid motor outlet to the sump port.

3. The valve assembly of claim 2, wherein:

the valve bore includes a central annular groove communicated with the reservoir port; and the sleeve includes an outer surface defining a pair of lands separated by a recess, the lands being slidably engageable with the wall of the valve bore to substantially prevent fluid communication between the load check valves and the reservoir port via the recess and the annular groove.

4. The valve assembly of claim 3, wherein:

each valve member includes a flange fixed between its stem and stub, exposed to fluid pressure from the corresponding inlet and engageable with an annular end surface of the sleeve, and each valve member also including a passage extending through its head and stem for communicating the corresponding inlet with the interior of the hollow sleeve, the inner end of the stem having an annular ball seated thereon; and the return valve further comprises a single valve ball received by the sleeve between the stems of the valve members and engageable with the ball seats thereon, pressurized fluid in the one inlet causing the sleeve to move so that one of its lands opens communication between the other inlet and the reservoir port via the recess and the annular groove, the moving sleeve carrying with it the valve member exposed to fluid pressure from the other inlet so that its stub opens the other check valve to permit return fluid flow from the other outlet to the reservoir port via the other check valve, via the sleeve recess and via the annular groove, the fluid pressure from the one inlet also acting upon the valve ball to maintain the valve ball seated against the ball seat of the valve member exposed to fluid from the other outlet to prevent fluid communication from the one inlet to the reservoir port via the interior of the valve members.

* * * * *